Patented May 22, 1945

2,376,447

UNITED STATES PATENT OFFICE 2,376,447

PLASTIC BITUMINOUS COMPOSITIONS

James B. Mullin, San Marino, Calif.

No Drawing. Application May 17, 1943,
Serial No. 487,365

2 Claims. (Cl. 106—277)

The instant application is a continuation as to common subject matter of my copending application entitled "Plastic bituminous compositions," filed by me on January 30, 1940, under Serial No. 316,373.

Compositions of the character about to be described find considerable use in industry for applying waterproofing coatings in situations in which the thickest layer producible by painting with asphalt paints, molten asphalts or bituminous emulsions is insufficient. Thus, they are used for patching roofs, sealing flashings and drains and, on a larger scale, for waterproofing brick or concrete walls in cellars, reservoirs and the like and for protecting insulating coverings exposed to the weather.

For such purposes the composition is usually applied with a trowel or float and it is essential to proper workability that it have a buttery or salve-like consistency, free from stringiness, tackiness or adherence to the trowel, and also that it be free from any tendency to run or crawl when applied to vertical or steeply inclined surfaces.

It is also essential that the coating, after it has set and hardened, be free from water-soluble substances and from any tendency to emulsify, soften, granulate or scale when subjected to the action of the elements or of standing water. For most uses it is also essential that the coating, after hardening, be waterproof in the sense of being impermeable to water.

Such products, known commercially but somewhat inaccurately as bituminous mastics, have consisted heretofore of more or less fluid bitumens or bituminous emulsions brought to a pasty consistency by loading with finely divided solids.

In the older practice, a reduced coal tar or semiliquid asphalt was mixed, while hot, with a large proportion of some finely divided, inert solid such as talc, kaolin or sugar-house lime. These products were satisfactorily water-resistant and waterproof but were too sticky to trowel readily and could not be applied in thick layers on other than horizontal surfaces because of their tendency to crawl during the extended hardening period.

In more modern practice, a liquid bituminous emulsion is first formed, ordinarily with the use of clay or other fine solid as the emulsifying agent, this emulsion being then loaded to the desired consistency with further quantities of clay or an equivalent solid in a state of extreme subdivision. This practice has the advantage over its predecessor that a much harder bitumen may be used and that the stringiness of the earlier compositions may be considerably reduced. On the other hand, the applied coating, after hardening, tends to lose its lustre and acquire a brownish tinge. It is also likely not to be impervious to water and tends strongly to degenerate (by slow re-emulsification) under the action of water and the elements. Further, these compositions are tedious and costly to manufacture and, unless prepared with the greatest care, are likely to separate out part of the mineral ingredients in continued storage.

For various reasons, the ideal plastic bituminous composition is one which consists substantially solely of bitumen emulsified with water. Such emulsions, however, are naturally of a liquid consistency because of the continuity of the aqueous phase. The viscosity of these liquid emulsions can be increased, within narrow limits, by increasing the proportion of bitumen, but the desired buttery consistency is not thereby attained, the consistency being that of a viscous liquid such as molasses. Inversion of the emulsion, making the bitumen the continuous phase, completely destroys workability. Thus, so far as I am aware, the problem of imparting a satisfactory working consistency to a fluid bituminous emulsion has not heretofore been solved.

I have discovered that a plastic composition having the ideal consistency for spreading, free from tendency to run or crawl either before or after setting, waterproof after hardening and highly resistant to water and to the action of the elements, may be produced by the carefully controlled precipitation of certain colloids in the aqueous phase of a thinly fluid bituminous emulsion of the type formed by the action of alkali on a saponifiable substance present in or added to the bitumen; i. e., of the type which avoids the use of solids as emulsifying agents.

In putting the invention into practice I start with a conventional liquid bituminous emulsion of either the penetrating or the mixing type. This emulsion may be prepared either from an asphalt capable of emulsifying with an alkali solution alone (an asphalt containing naphthenic or the so-called "asphaltogenic" acids) or one incapable of so emulsifying. The initial consistency of this asphalt may be governed to suit the purpose to which the plastic composition is to be applied, and may range from a thickly fluid to a moderately hard consistency. The upper limit of hardness is fixed by the requirement that the dispersed asphalt particles must coalesce to form a dense and impermeable layer as the aqueous phase disappears.

In the use of a naturally emulsifiable asphalt I prefer to use from 50 to 65 parts by weight of the bitumen with from 50 to 35 parts by weight of a dilute alkali solution. This solution may contain from 0.1% to 2% by weight of any alkali metal hydroxide or carbonate, such for example as sodium or potassium hydroxide, sodium or potassium carbonate, or proportionate quantities of the alkali silicates or the trialkyl phosphates. The bitumen being brought to a temperature of fluidity, emulsification is effected by any conventional means such as mechanical agitation or pump circulation.

The proportions of bitumen and of aqueous alkali are suggestive only. Ordinarily it would not be desirable to use less than 50% of bitumen, but in some cases it would be permissible to use more than 65%. In any case the use of a thickly fluid, viscous emulsion as a starting material must be avoided in order to obtain a satisfactory product. The nature of the bitumen used will have some influence on the maximum proportion of bitumen which the emulsion will tolerate.

If a nonemulsifiable asphalt is taken as the starting material, an addition of a very minute amount of soap should be made, preferably by adding oleic acid to the alkali solution before starting to emulsify. The quantity of soap should be such as to permit the formation of a fine, intimate and stable dispersion of the bitumen, as for example from a mere trace, of the order of 0.01% of the total weight of materials, up to 0.5%. The quantity of soap should be held as low as possible as it is undesirable to introduce water-soluble materials into the final coating, and the use of the large proportions of soap disclosed in some of the earlier emulsion patents should be avoided.

To the finished liquid emulsion I then add a small quantity of an organic stabilizing colloid. For this purpose I prefer to use casein when available, though numerous other colloids may be used in its stead. For example, I may use albumin, glue or gelatine, starch, the roots or root barks having colloidal constituents such as soapwort, quillai, quebracho, lilywort, licorice or soaproot, or other colloid-containing substances such as blood, milk, etc. The clays, bentonites and other inorganic colloids are nonfunctional for my purpose, though their presence in small quantities does not interfere with the gelatinization if the organic colloidal substance also be added. Some of the roots and root barks contain important quantities of tannin, but as the thickening or gelatinization about to be described is produced by the use of numerous substances which are wholly free from tannin it appears that the presence of this constituent is incidental and immaterial. So far as I am aware, all of the organic substances having well developed colloidal properties and stabilizing properties for bituminous emulsions may be utilized. It will be pointed out, however, that not all of the colloids are of equal value for my purpose and that in the use of some of them a closer selection of the precipitating agent must be made than when other colloids are used.

The colloid may be introduced into the emulsion in one of a variety of ways, according to its physical character and the readiness with which it disperses. For example, the roots and root barks may be ground very finely, either wet or dry, and made into a thin paste or slurry with water, this paste then being disseminated through the emulsion by gentle stirring. Casein may similarly be added but without previous grinding. The glues, gelatins, starches and dry albumins should be thoroughly soaked and swelled in water and, preferably, gently heated before adding to the emulsion. Or the last named substances may be added in the same manner as casein, the paste being stirred through the emulsion, the whole allowed to stand for some hours and a gentle heat then applied. Some economy of colloid may be effected in this manner though considerably more time is required. The aim in any case is to disseminate the colloid evenly throughout the aqueous phase of the emulsion, and the technique followed will necessarily be governed by the nature of the colloid used.

The final step in the preparation of the plastic composition is to intermix with the colloid-containing emulsion the critical quantity of a gelatinizing agent which is compatible with the specific colloid used. The methods of predetermining compatibility and critical dosage will be described below, as well as the range of gelatinizing agents from which the selection may be made. For the present it may be assumed that these factors are known.

The gelatinizing agent, which will be either a salt or an acid, may be added either as a strong aqueous solution or, in the case of some salts, as a dry powder. If the substance be soluble in a small quantity of water I prefer to bring it to the condition of a substantially saturated aqueous solution. If the gelatinizing agent be less readily soluble, so that the quantity of water required to bring it into aqueous solution would materially dilute the final product, I add it in the form of a dry powder or of an aqueous suspension of such a powder and allow time for it to dissolve in the water of the emulsion. Strong acids such as sulfuric or nitric should be diluted to the point at which any secondary reaction on the bitumen itself will be avoided.

On the addition to the colloid-containing emulsion of the critical quantity of gelatinizing agent which is compatible with the particular colloid used, the emulsion thickens and assumes the described buttery or salve-like consistency as soon as the agent has been diffused throughout the emulsion. In this consistency, the product is short and devoid of stringiness, spreads readily and smoothly without adhering to or following the trowel, and flows only under pressure.

This result is produced instantaneously in adding and intermixing aqueous solutions of the agent. If the latter be in the form of an aqueous suspension of a slowly soluble powder the change of state will not occur until the agent passes into solution and is therefore more gradual. When the change occurs the product is finished and may be used or placed in packages for shipment. It should be protected from the air when in storage, to avoid change of consistency due to loss of water by evaporation.

A great number of both salts and acids may be used as gelatinizing agents with appropriate colloids. Not all of the salts nor all of the acids are functional, and some acids which give a satisfactory result with some colloids are nonfunctional with others. Results obtained experimentally in the use of various salts, alkalis and acids with different colloids are set forth in the table following: metals are nonfunctional for the preparation of my plastic composition.

| Gelatinizing agent | Colloid | Colloid, per cent | Agent, per cent | Character of product |
|---|---|---|---|---|
| Aluminum sulfate | Casein | 0.50 | 0.361 | First quality plastic. |
|  | ....do.... | 0.50 | 0.472 | Do. |
|  | Quebracho | 1.00 | 0.325 | Do. |
|  | ....do.... | 1.20 | 0.068 | Do. |
|  | Blood | 0.50 | 0.540 | Do. |
|  | Starch | 1.00 | 0.371 | Do. |
|  | ....do.... | 2.00 | 0.338 | Do. |
|  | Gelatine | 2.50 | 0.379 | Do. |
|  | ....do.... | 0.50 | 0.796 | Do. |
|  | Albumin | 1.00 | 0.433 | Do. |
| Antimony trichloride | Casein | 0.50 | 1.430 | Do. |
| Cadmium nitrate | ....do.... | 0.50 | 0.770 | Do. |
| Chromium trichloride | ....do.... | 0.50 | 1.200 | Do. |
| Cobaltic chloride | Casein | 0.50 | 0.328 | Do. |
|  | Quebracho | 1.33 | 0.291 | Do. |
| Cupric chloride | Casein | 0.50 | 0.224 | Do. |
|  | Quebracho | 1.33 | 0.112 | Do. |
|  | Casein | 0.50 | 0.508 | Do. |
|  | ....do.... | 0.50 | 0.780 | Do. |
| Cupric sulfate | Quebracho | 1.33 | 1.084 | Do. |
|  | ....do.... | 1.20 | 0.390 | Do. |
|  | Blood | 0.50 | 0.682 | Do. |
|  | Starch | 2.00 | 0.488 | Do. |
|  | Gelatine | 0.50 | 1.131 | Do. |
| Ferrous sulfate | Casein | 0.50 | 0.250 | Do. |
| Lead acetate | ....do.... | 0.50 | 1.710 | Do. |
| Manganese chloride | ....do.... | 0.50 | 0.730 | Do. |
| Nickel nitrate | Casein | 0.50 | 0.328 | Do. |
|  | Quebracho | 1.33 | 0.359 | Do. |
| Silver nitrate | Casein | 0.50 | 1.430 | Do. |
|  | Quebracho | 1.33 | 1.084 | Do. |
| Stannic chloride | Casein | 0.50 | 0.452 | Do. |
|  | Quebracho | 1.33 | 0.335 | Do. |
| Zinc sulfate | Casein | 0.50 | 0.476 | Do. |
|  | Quebracho | 1.33 | 0.349 | Do. |
| Calcium chloride | Casein | 0.50 | 0.778 | Do. |
|  | Quebracho | 1.33 | 4.000 | Do. |
| Barium chloride | Casein | 0.50 | 0.800 | Emulsion broke, none. |
|  | Quebracho | 1.33 | 4.000 | Fair grade plastic. |
| Sodium chloride | Casein | 3.00 | 8.000 | Do. |
| Ammonium chloride | ....do.... | 6.00 | 10.400 | Do. |
| Potassium hydroxide | ....do.... | 0.50 | Excess | Viscous, not plastic. |
| Sodium carbonate | ....do.... | 0.50 | Excess | Do. |
|  | Casein | 0.50 | 0.270 | First quality plastic. |
|  | ....do.... | 0.50 | 0.250 | Do. |
| Hydrochloric acid | Quebracho | 1.20 | 0.180 | Do. |
|  | Blood | 0.50 | 0.324 | Do. |
|  | Starch | 2.00 | Excess | Product not obtained. |
| Nitric acid | Gelatine | 0.50 | Excess | Do. |
|  | Casein | 0.50 | 0.356 | First quality plastic. |
|  | Casein | 0.50 | 0.356 | Do. |
|  | ....do.... | 0.50 | 0.400 | Do. |
|  | ....do.... | 1.00 | 0.380 | Do. |
| Phosphoric acid (ortho) | Quebracho | 1.20 | 1.000 | Do. |
|  | Blood | 0.50 | 0.200 | Do. |
|  | ....do.... | 1.00 | 0.190 | Do. |
|  | Starch | 2.00 | Excess | Product not obtained. |
|  | Gelatine | 0.50 | Excess | Do. |
| Sulfuric acid | Casein | 0.50 | 0.368 | First quality plastic. |
| Oxalic acid | Quebracho | 1.33 | 0.288 | Do. |
|  | Casein | 0.50 | 0.368 | Do. |
|  | Casein | 0.50 | 1.156 | Do. |
|  | ....do.... | 0.50 | 1.400 | Do. |
| Acetic acid | Quebracho | 1.33 | 0.625 | Do. |
|  | ....do.... | 1.20 | 1.200 | Do. |
|  | Blood | 0.50 | 0.400 | Do. |
|  | Starch | 2.00 | Excess | Product not obtained. |
| Boric acid | Gelatine | 0.50 | Excess | Do. |
|  | Casein | 1.00 | Excess | Do. |

The general conclusions which I draw from this and other experimental work are as follows:

1. Casein, quebracho and its equivalents, blood and albumin are the most desirable colloids for my purpose and are functional with all of the soluble heavy metal salts, with some of the alkali-earth metal salts and with the stronger acids;

2. Starch and gelatine are functional with the heavy metal salts but do not give desirable results with the acids;

3. The salts of the alkali-earth metals are functional with some of the colloids but may be considered on the border line;

4. The salts of the alkali metals are functional with casein, at least, but require such extravagant doses as to be of no utility for my purpose;

5. The acids are less desirable as gelatinizing agents than the heavy metal salts, because of the acidity of the products obtained, though the stronger acids are functional with the more desirable colloids.

6. The hydroxides and carbonates of the alkali

7. The hydrogen ion concentration of the product may vary over a wide range, from pH 1.8 to pH 9.1 in various experiments, and appears to have no relation whatever to the formation of the product or to its characteristics when formed.

As these generalities do not afford any dependable guide to the selection of materials which will certainly be functional in combination, I have sought for and have discovered a test by which the compatibility of the preferred or available colloid with various gelatinizing agents may be predetermined.

In making this test I prepare a dispersion of about 2% by weight of the selected colloid in a 1% aqueous solution of sodium carbonate. Into this dispersion I feed slowly, with stirring, a total of about 40% by volume of the strong aqueous solution of the agent to be tested. If, during this addition, a precipitate appears, the colloid and the agent are compatible and if this combination of additives is used in a suitable emulsion and in the critical proportion the desired plastic composition will be obtained. Per contra, if no precipitate is formed the combination is nonfunctional, though each of the materials used may be functional with another agent or with another colloid. In using an acid as the agent there may be an evolution of carbon dioxide from the sodium carbonate, which should not be confused with a precipitate. The precipitate may be flaky, granular, powdery or gelatinous in various combinations, and in some cases may partially redissolve before all of the agent has been added. None of these factors appears to be material to the interpretation of the test.

There is no dependable relation between the quantity of an agent required to precipitate a given colloid from aqueous dispersion and the quantity of the same agent required to produce the plastic composition when added to an emulsion containing the same colloid. The test is considered to be qualitative only, for determining compatibility, i. e., functionality of the combination. The dosage of the agent is determined in a second test which will later be described.

The dosages indicated in the table above are suggestive but not limiting. With each different colloid there is some minimum dose below which the emulsion breaks instead of assuming the plastic state on the addition of the acid or salt. With casein, blood and gelatine the minimum dose of colloid appears to be about 0.25% of the weight of emulsion treated; with quebracho and other roots and root barks about 0.50% and with starch about 1.00%. The maximum dosage is not so limited and an excess of the colloid appears to be harmless so far as the consistency and stability of the product are concerned. However, the colloid is an important element in the final cost of the product and further it is undesirable to have any excess of organic matter present in the applied coating, as tending to reduce weather resistance.

As it is impossible to lay down an absolute rule as to optimum dosage of colloid, by reason of the variation in intrinsic stability of different emulsions in which it may be used, I consider it desirable to use initially about the quantity indicated by the above table and gradually to reduce the dosage as experience or laboratory experiment may indicate as being safe.

Having prepared a suitable thinly fluid emulsion as above described, and having dispersed in a sample of this emulsion a known dose of the preferred or available colloid, and having determined in the manner above referred to that the intended gelatinizing agent is actually functional with the specific colloid used, the final preliminary step is to determine the critical dosage of the agent, salt or acid, by which the plastic consistency is produced.

This test is a simple titration, at room temperature, of a measured or weighed quantity of the colloid-containing emulsion with the solution of agent intended for large scale use.

As the solution is added to the emulsion, slowly and with gentle stirring, local coagulation takes place and, as this coagulation is stirred out, the emulsion will be observed to thicken and gradually to become "short," i. e., salve-like rather than thickly viscous. The addition of an excess of the gelatinizing agent may result merely in the thinning of the plastic, buttery product, or it may first produce a change from the salve-like consistency to the thickly fluid consistency and thereafter reduce the viscosity of the product. The critical point is that at which the change of state from fluid to plastic is observed. This change of state is difficult to describe but is readily observed experimentally, and is ordinarily so abrupt that in titrating samples of 25 ml. of the emulsion a single drop of the solution will produce the change, thus affording a quite definite end point for the titration.

In preparing a commercial batch of the composition the relative quantities of emulsion and gelatinizing agent may be taken directly from the laboratory result. It is desirable, however, as the end of the dose of agent is approached, to add the solution slowly and cautiously and to note the change in appearance of the batch. In case a batch is accidentally overdosed with the agent and the point of maximum consistency thus passed, the desired consistency may be restored by cautious additions of emulsion containing its normal quota of the colloid.

This restoration of an overdosed batch should not be attempted by adding further colloid to the batch. Strangely enough, the dose of gelatinizing agent appears, in some cases at least, to decrease as the dose of colloid is increased. The following experimental figures are illustrative, referring to a series of tests in which substantially the same consistency of composition was realized in each case.

| Gelatinizing agent | Colloid | Colloid, per cent | Agent, per cent |
| --- | --- | --- | --- |
| Aluminum sulfate | Casein | 0.50 | 0.420 |
| | do | 1.50 | 0.395 |
| | do | 3.50 | 0.351 |
| | Starch | 1.00 | 0.351 |
| | do | 2.00 | 0.341 |
| | do | 4.00 | 0.325 |
| | Blood albumin | 1.00 | 0.435 |
| | do | 2.00 | 0.395 |
| | do | 3.00 | 0.351 |
| | Quebracho | 0.28 | 0.354 |
| | do | 0.38 | 0.347 |
| | do | 0.85 | 0.328 |
| | do | 1.16 | 0.313 |
| | do | 1.70 | 0.298 |
| | do | 2.84 | 0.260 |
| | do | 2.80 | 0.225 |

It is possible, by suitable selection of colloid and of gelatinizing agent, to obtain a product which is substantially neutral or, for special purposes, a product distinctly acid or alkaline as may be preferred. Thus, casein gives a product within the range pH 6.0 to pH 7.9 with salts of copper, silver, cadmium, zinc, lead, aluminum, manganese and nickel. Quebracho yields products of 8.0 and above with most of the above salts. The free acids and the chlorides of tin, antimony and chromium yield acid products, from pH 5.5 down to pH 1.8, with both of these colloids. In these experiments the pH of the original emulsion was 12.5+; after addition of casein the pH was 10.1 and after addition of the quebracho 10.6.

Plastic bituminous compositions produced by the methods described above have all the desirable characteristics developed to the highest degree. They have the required buttery consistency, spread easily and maintain their position even when spread in layers of considerable thickness on steeply inclined surfaces. The aqueous phase rapidly disappears and the coating remaining is dense, impervious to water and highly resistant to the elements. The composition is stable in storage over long periods and its consistency is not altered by stirring. It will tolerate and, by reason of its consistency, will dependably support even a considerable addition of solid or fibrous substance such as talc, iron oxide, jute or asbestos.

In cases where solid materials such as asbestos are to be a part of the finished product I prefer to add them during the process of manufacture rather than to the finished plastic composition. For example, asbestos fibre may be brought to a thickly fluent condition by stirring with water and this aqueous mass dispersed in the liquid emulsion, the colloidal constituent being added to the emulsion previously or simultaneously as may be preferred. The whole being well blended, the gelatinizing agent is added and stirred in, the change in consistency occurring during this step. The finished product containing fibrous material has the characteristic buttery consistency, somewhat modified by the presence of the fibres, and should be of such consistency that a rather stiff brush may be plunged into it for painting or such that it may be trowelled into place. Such consistencies are included in the term "salve-like" as used in the claims.

In no case is a clay or bentonite to be substituted for the organic colloid and ordinarily it is not desirable to add clays or bentonites to the composition. The single exception is that the smoothness of free trowelling characteristic may in some cases be improved by the addition of a minute quantity, of the order of 1% by weight, of a highly colloidal bentonitic clay.

The acids hereinabove described as operative have dissociation constants for the first hydrogen greater than $1\times10^{-6}$, and that limitation is fixed in the appended claims to exclude certain weak acids, such as boric acid, which are inoperative. The salts herein disclosed as operative are salts of metals having electrode potentials less than $+2.4$, and that limitation is fixed in the claims to exclude salts of the alkali and alkaline-earth metals which are nonfunctional or are functional to so slight a degree as to be useless for the present purpose.

I claim as my invention:

1. A plastic bituminous composition: a nonfluent, soft, solid mass having a salve-like texture and free from tackiness and stringiness, said mass consisting substantially of bitumen finely dispersed in water containing an alkali-metal soap as the emulsifying agent, in such proportions as normally to produce a thinly fluid emulsion, said mass containing small proportions of additives including a selected organic, colloidal, stabilizing substance and a water-soluble solidifying agent selected from the group consisting of the acids having a dissociation constant for the first hydrogen greater than $1\times10^{-6}$ and the water-soluble salts of metals having an electrode potential at 25° cent. lower than $+2.4$, said solidifying agent having the further property of precipitating said selected colloid from dispersion in emulsion-free alkaline water, the quantity of said organic colloidal stabilizing substance being sufficient to prevent the breaking of the emulsion upon the addition of the solidifying agent, and the quantity of said solidifying agent being sufficient only to cause the substantial solidification of said thinly fluid emulsion; said composition when finished containing substantially all the water present in the original thinly fluid emulsion.

2. The method of producing a plastic bituminous composition having a salve-like texture, free from tackiness and stringiness, and a nonfluent, soft, solid consistency, which comprises: preparing a thinly fluid emulsion of bitumen in water using an alkali-metal soap as the emulsifying agent; stabilizing said emulsion by adding thereto a selected organic, colloidal, stabilizing substance in sufficient quantity to prevent breaking of the emulsion upon the ensuing addition of a solidifying agent; substantially solidifying said stabilized emulsion by adding thereto a water-soluble solidifying agent selected from the group consisting of the acids having dissociation constants for the first hydrogen greater than $1\times10^{-6}$ and the water-soluble salts of metals having an electrode potential lower than $+2.4$, said water-soluble solidifying agent having the further property of precipitating said selected colloid from dispersion in emulsion-free alkaline water; limiting the addition of said agent to the quantity required to effect said substantial solidification, and retaining in the finished composition substantially all the water present in the original thinly fluid emulsion.

JAMES B. MULLIN.